July 24, 1923.

T. B. HUESTIS 1,462,859

STITCHING MACHINE FOR JOINING RUBBER

Filed Sept. 20, 1922

Inventor
Thomas B. Huestis
By his Attorney
Ernest Hopkinson

Patented July 24, 1923.

1,462,859

UNITED STATES PATENT OFFICE.

THOMAS B. HUESTIS, OF BRISTOL, RHODE ISLAND, ASSIGNOR TO NATIONAL INDIA RUBBER COMPANY, OF BRISTOL, RHODE ISLAND, A CORPORATION OF RHODE ISLAND.

STITCHING MACHINE FOR JOINING RUBBER.

Application filed September 20, 1922. Serial No. 589,456.

*To all whom it may concern:*

Be it known that I, THOMAS B. HUESTIS, a citizen of the United States, residing at Bristol, in the county of Bristol and State of Rhode Island, have invented a certain new and useful Stitching Machine for Joining Rubber, of which the following is a full, clear, and exact description.

This invention relates to a stitching machine for joining rubber, more particularly to a machine for firmly uniting lapped portions of sheeted rubber or rubberized fabric.

In the building up of articles of vulcanizable compound, such as those formed of sheeted rubber or rubberized fabric, and more particularly in the building of rubber footwear, a small hand tool known as a stitcher is commonly used. This tool consists of a toothed rotatable disk with a handle, and in use the operator runs it along the lapped portion of two rubber or rubberized sheets with sufficient pressure to form a line of small indentations. This operation not only assists in more firmly uniting the superposed plies, but it also simulates the appearance of a line of stitches as made by a sewing machine, hence the name "Stitcher" commonly applied to the tool in the art. This tool is largely used in the building up of rubber footwear, hand baggage, handmade water bags, etc. However, in using the stitcher on a footwear article, which latter is assembled on a last, it is necessary to steady or hold the article and last with one hand while using the stitcher with the other hand, and as a result the pressure cannot be applied as effectively nor the tool guided as accurately as if both hands were free. Moreover, the time taken in the operation is quite an item, since labor employed for work of this character is largely paid by the piece.

An object of my invention is to provide a simple, effective and rapid machine for joining superposed rubber or rubberized sheets by the stitching operation.

Figure 1:
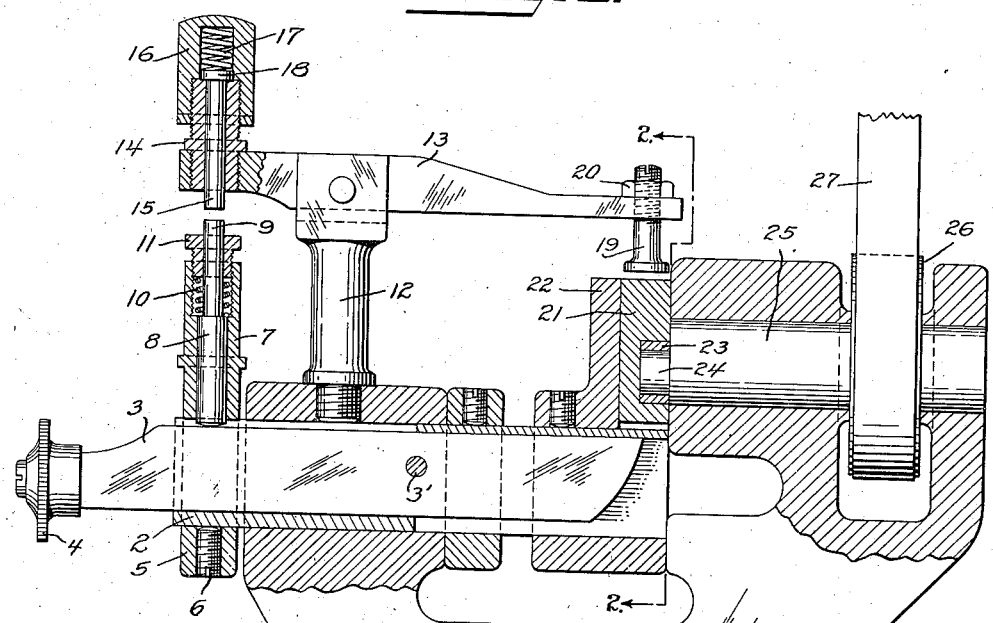
Fig. 1 is a central longitudinal section partly in side elevation of the machine.
Figure 2:
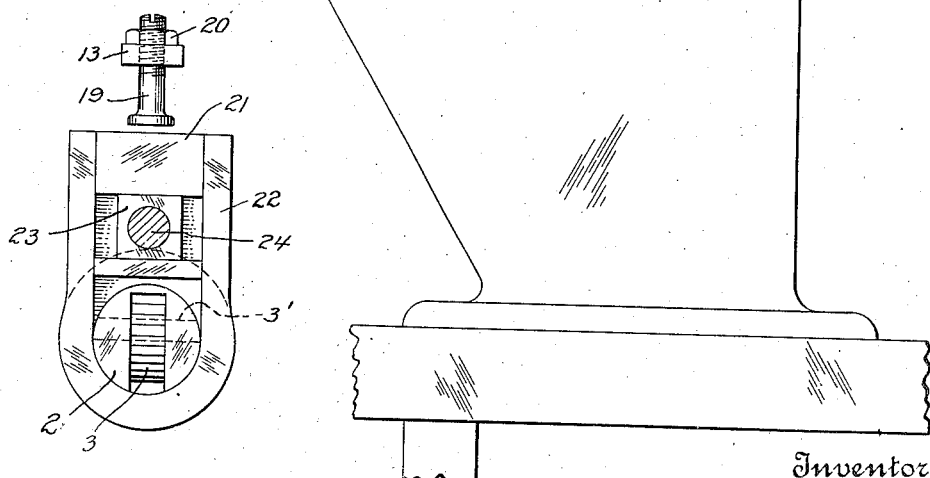
Fig. 2 is a section on the line 2—2 of Fig. 1.

Referring to the drawing, the numeral 1 represents the frame of the machine, which may be mounted in any suitable manner, as on a table. Rigidly secured in the frame is a bearing member 2 in which a lever 3 is pivotally mounted at 3', the free end of the lever carrying a small toothed wheel 4 rotatably mounted thereon. A collar 5 is secured to the bearing 2 by the set screw 6 and is provided with an extension 7 in which is slidably mounted a contact pin or plunger 8, one end of which is adapted to engage the lever, 3. The other end of the contact pin is reduced in diameter as shown at 9, and the extension 7 is formed with a threaded counter bore opposite the reduced portion 9, in which counter bore a coiled compression spring 10 is disposed around the portion 9 of the pin, the pressure of which spring may be adjusted by means of the nut 11. Also secured in the frame 1 is a bracket 12 at the upper end of which a lever 13 is pivotally mounted. At one end of the lever a tubular threaded bearing member 14 is mounted, in which is reciprocable a second contact pin or plunger 15 disposed in alignment with the pin 8 and normally slightly spaced therefrom. A threaded adjusting cap 16 is mounted on the upper end of the bearing member 14, and within the cap is disposed a coil spring 17 bearing against the head 18 of the pin 15. At the opposite end of the lever 13 an impact member 19 is threadedly mounted, and it may be secured in adjusted position by means of the lock nut 20. The lower end of the impact member 19 is disposed slightly above and in alignment with a reciprocatory block 21, mounted in a bearing 22 secured to the bearing member 2. The block 21 is provided with a transverse groove in which is slidably mounted a second block 23, the latter having a circular bore therein in which is rotatably fitted a crank pin 24 carried by a shaft 25 having a bearing in the frame 1. Secured to the shaft 25 is a pulley 26 driven by a belt 27 from any suitable source of power.

In operation of the device an article such as a rubber shoe in which, for instance, it may be desired to stitch down the edge of the outsole onto the upper, is held by the operator with both hands and pressed upwardly against the lower periphery of the toothed wheel 4, with the result that the free end of lever 3 is tilted slightly, moving the contact member 8 upwardly against the pressure of spring 10 into a position where the lower end of the contact pin 15 can engage it. The lever 13 is given a rapid vibratory movement by the blows struck the impact member 19 by block 22, which vibratory movement is transmitted through the yieldingly mounted contact pin 15 to the pin 8 and thence through the lever 3 and wheel 4 to the rubber surface which it is desired to indent or stitch. The movement of the lever 3 is quite limited and it is vibrated at a relatively high speed, for instance, two thousand strokes a minute. The operator guides the edge of the sole along beneath the wheel 4, which latter rolls along the article while at the same time it is given a rapid vibratory movement by the lever 3.

It will be seen that by my invention a machine is provided which is much more rapid than the hand stitcher, and which allows both hands of the operator to be free to grasp the article operated upon, so that the article can be held more steadily and at the same time guided more rapidly and accurately during the stitching operation. While the machine is particularly designed for uniting and stitching plies of rubber or rubberized material, it is evident that it is not limited in its use to such a purpose, but may be used wherever it is desired to form a line of fine indentations on an article or to produce a rapid hammering action upon the article. A specific embodiment of the invention has been shown and described, but it is obvious that numerous modifications may be made therein within the scope of the appended claims.

Having thus described my invention, what I claim and desire to protect by Letters Patent is:

1. A stitching machine comprising a pivotally mounted stitching tool, means independent thereof for rapidly vibrating the same, and means for operatively connecting them upon pressing an article to be stitched against said tool.

2. A stitching machine comprising a pair of pivotally mounted lever arms, a stitching device carried by one of them, yieldable means for operatively connecting said arms upon pressing an article to be stitched against said device, and means for rapidly vibrating said second arm.

3. A stitching machine comprising a pair of pivotally mounted lever arms, a rotatable stitching device carried by one of them, means for rapidly vibrating the other arm, and a contact pin in operative relation to each arm, said pins being adapted to contact upon pressing an article to be stitched against said device.

4. A stitching machine comprising a lever arm, means for rapidly vibrating the same, a contact pin yieldably connected to said arm, a second contact pin in alignment with the first one, means for urging the second pin away from the first one, a second lever arm contacting with said second pin, and a rotatable stitching device carried by the second arm.

5. A stitching machine comprising a lever, a roughened rotatable stitching tool mounted thereon, a contact pin, means for urging one end thereof into contact with said lever, a second lever, a contact pin resiliently carried thereby in alignment with said first pin, a slide block adapted to actuate the second lever, and means for reciprocating said slide block.

6. A rubber stitching machine comprising a lever, a roughened rotatable stitching tool mounted thereon, a contact pin engaging said lever, an adjustable spring for maintaining the pin and lever in contact, a second lever, a contact pin resiliently carried thereby in alignment with the first pin, an adjustable impact member carried by said lever, and means for rapidly striking said impact member.

Signed at Bristol, in the county of Bristol and State of Rhode Island, this 18th day of September, 1922.

THOMAS B. HUESTIS.